United States Patent [19]

Zimmerman

[11] Patent Number: 4,858,773
[45] Date of Patent: Aug. 22, 1989

[54] COOLING/BAKING RACK

[76] Inventor: Karen M. Zimmerman, 1949 Woodhaven Dr., Fort Wayne, Ind. 46819-1053

[21] Appl. No.: 225,024

[22] Filed: Jul. 26, 1988

[51] Int. Cl.$^4$ .............................................. A47F 5/13
[52] U.S. Cl. .................... 211/149; 211/150; 211/195; 211/182; 211/132; 211/170; 248/222.3
[58] Field of Search ............ 211/149, 132, 195, 169.1, 211/182, 150, 170, 99, 201; 248/222.2, 222.3

[56] References Cited

U.S. PATENT DOCUMENTS

| | | | |
|---|---|---|---|
| D. 190,353 | 5/1961 | Chesley | 211/132 X |
| 840,512 | 1/1907 | Palmer | 211/99 |
| 969,495 | 9/1910 | Rape | 211/201 X |
| 1,735,220 | 11/1929 | Taylor | 108/107 |
| 2,892,548 | 6/1959 | Huff | 211/195 |
| 2,919,816 | 1/1960 | Maslow | 108/111 |
| 3,180,606 | 4/1965 | Sabin et al. | 248/222.3 X |
| 3,235,096 | 2/1966 | Hallock et al. | 211/149 |
| 3,252,434 | 5/1966 | Young, Jr. | 211/149 X |
| 3,420,482 | 1/1969 | Taylor | 248/222.3 |
| 3,767,059 | 10/1973 | Seiz | 211/149 |
| 3,848,748 | 11/1974 | Ceccarelli | 211/195 |
| 3,967,327 | 7/1976 | Severson | 182/140 X |
| 4,448,314 | 5/1984 | Weiller | 211/184 X |
| 4,558,647 | 12/1985 | Petersen | 108/107 |
| 4,648,517 | 3/1987 | Schäfer | 211/195 X |
| 4,684,091 | 8/1987 | Moreschi | 211/182 X |
| 4,688,681 | 8/1987 | Bergeron | 211/195 X |

FOREIGN PATENT DOCUMENTS

| | | | |
|---|---|---|---|
| 1087568 | 8/1960 | Fed. Rep. of Germany | 211/149 |
| 1230634 | 3/1962 | France | 248/222.3 |

*Primary Examiner*—Ramon S. Britts
*Assistant Examiner*—David G. Kolman
*Attorney, Agent, or Firm*—Barnes & Thornburg

[57] ABSTRACT

A foldable cooling/baking rack has first and second end frames, each of which includes a pair of laterally spaced posts. The rack also has a plurality of generally rectangular shelving elements which are generally horizontally disposed and which are connected to the end frames. The shelving elements and end frames are movable between an upright, operable position and a folded, inoperable position. In the upright positions, the shelving elements are disposed generally perpendicularly to the end frames, while in the folded, inoperable position, the shelving elements and end frames are disposed in a generally non-perpendicular relationship. In one embodiment, the shelving elements are detachably connected to the second end frame, and are pivotably, but non-detachably, connected to the first end frame. A number of alternative joints, including T-shaped and L-shaped joints, are suggested for the pivotal connection between the shelving elements and the first end frame. Likewise, a number of alternative embodiments for the detachable connection between the shelving units and second end frame are also provided.

11 Claims, 2 Drawing Sheets

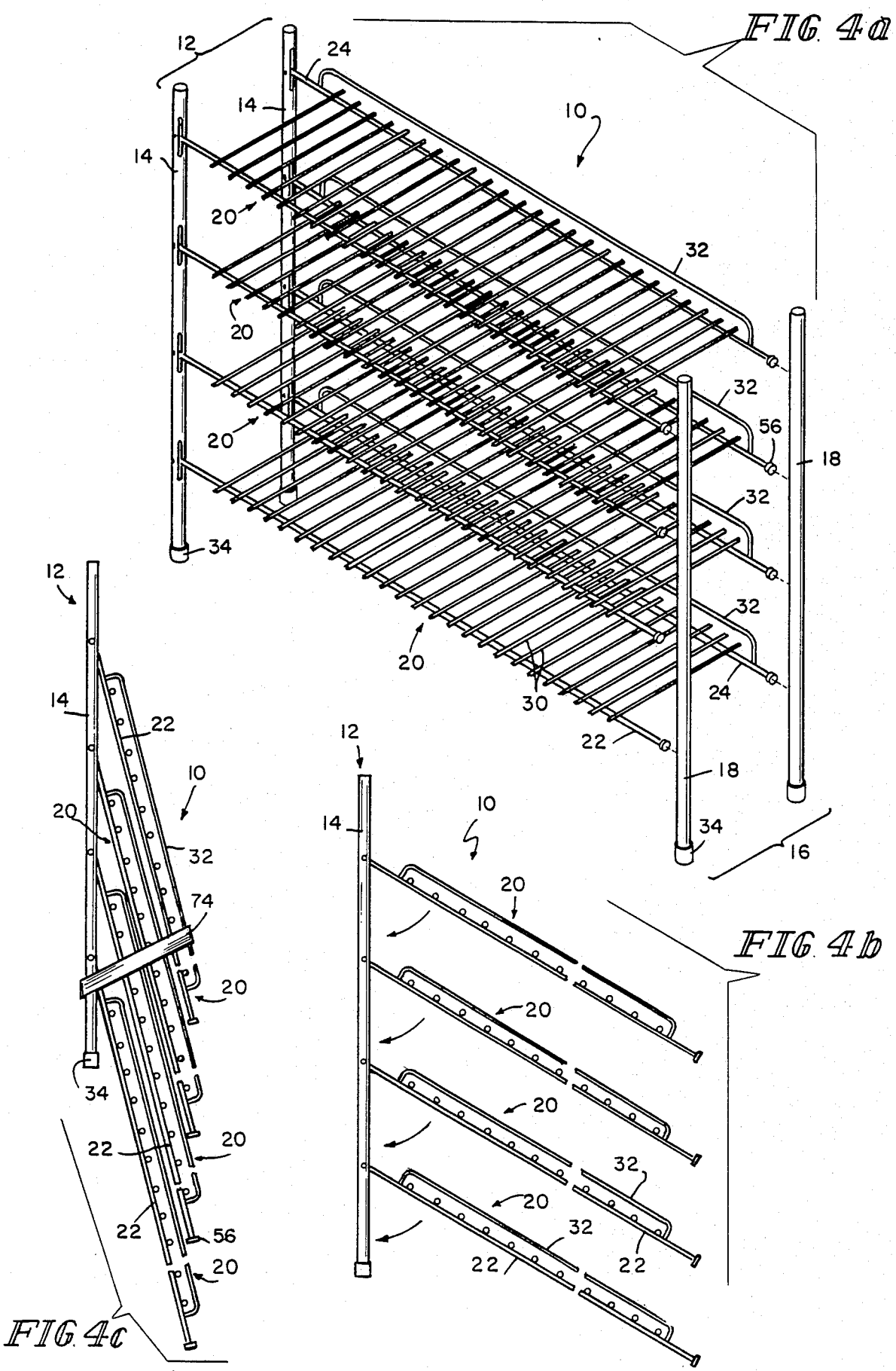

COOLING/BAKING RACK

BACKGROUND AND SUMMARY OF THE INVENTION

The present invention relates generally to a foldable cooling/baking rack which is especially well-suited for staging cooking pans prior to insertion into an oven, or for cooling pans after removal from an oven. Pans may be placed on the rack prior to insertion into the oven in the order they are to be prepared. Similarly, the pans may be allowed to cool on the rack after they are removed from the oven.

When an item is removed from an oven, it must be allowed to cool before being removed from the pan or further handled. Because of the high temperatures involved, care must be taken when handling such items. Many residential kitchens do not have the capability of storing pans taken from an oven while they are cooling.

An object of the present invention is to provide a foldable cooling/baking rack which will support pans taken from an oven while cooling and do so conveniently in a limited space.

Another object of the present invention is to provide a foldable cooling/baking rack which folds to accommodate easy storage.

Yet another object of the present invention is to provide a foldable cooling/baking rack of sturdy construction for residential, counter-top use.

These and other objects are attained in a foldable cooling/baking rack comprising a first and a second end frame, each frame including a pair of laterally spaced posts, and a Plurality of generally rectangular shelving elements. The shelving elements are disposed generally horizontally and connected to the end frames. In a preferred embodiment, the shelving elements are generally perpendicular to the end frames when the rack is upright, and generally non-perpendicular to the end frames when the rack is in a folded position. In this embodiment, the second end frame is detachable, allowing the shelving elements to pivot relative to the first end frame. The shelving elements are pivotably attached to the first end frame by means of a T joint. This allows the shelving elements to remain fixed to the first end frame, but pivot in either direction relative to the first end frame. The shelving elements are detachably connected to the second end frame, such that the second end frame may be completely detached from the rack. A locking means secures the rack when it is in an operable, upright position. A backstop is mounted on each shelving element to further secure the pans resting thereon. Rubber stoppers form the base of the rack, and prevent the rack from sliding when in the upright position, as well as minimize heat transfer to the counter. A means is provided for securing the end frames and shelving elements when the rack is in the folded, inoperable position.

Other objects, advantages and novel features of the present invention will become apparent from the following detailed description of the invention when considered in conjunction with the accompanying drawings.

BRIEF DESCRIPTION OF THE DRAWINGS

FIGS. 4a, 4b and 4c show the foldable cooling/baking rack of the present invention in various stages of a folded, inoperable position.

DETAILED DESCRIPTION OF THE DRAWINGS

Figure 1:
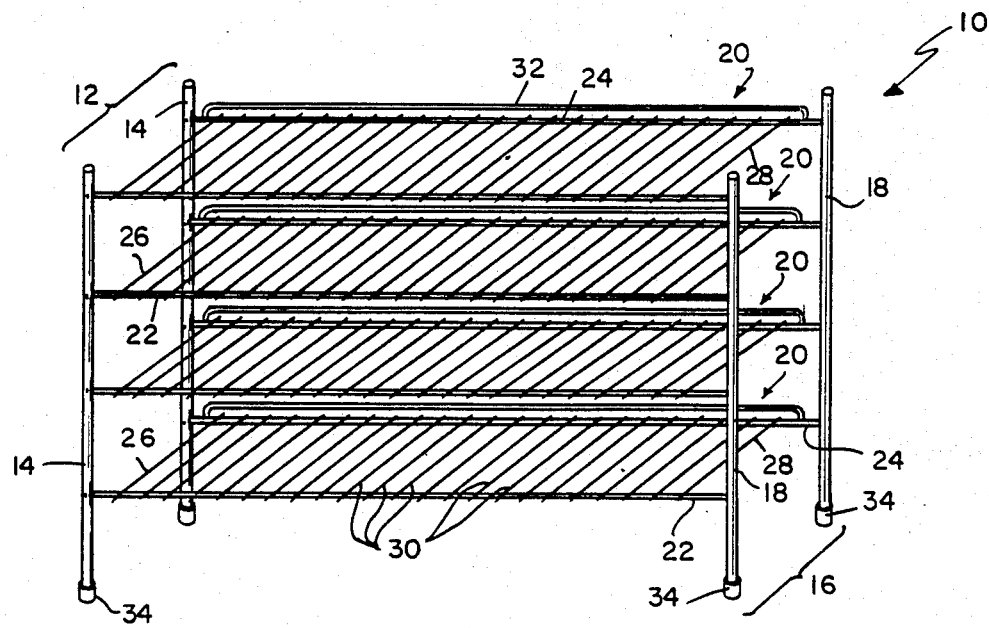
FIG. 1 shows a perspective view of a foldable cooling/baking rack, constructed in accordance with the present invention in an upright, operable position.

FIG. 1 shows a perspective view of a foldable cooling/baking rack 10 of the present invention. First end frame 12 comprises two laterally spaced posts 14. Second end frame 16 comprises two laterally spaced posts 18. Rectangular shelving elements 20 are attached at their opposite ends to first end frame 12 and second end frame 16. In a preferred embodiment, the shelving elements comprise first and second longitudinal beams 22, 24, and first and second transverse beams 26, 28. A plurality of members 30 extend between first longitudinal beam 22 and second longitudinal beam 24 so as to support the items placed on the shelving element. A backstop beam 32 is supported parallel to and slightly above second longitudinal beam 24. Rubber feet 34 are attached to the bottom ends of laterally spaced posts 14 and 16 to frictionally engage the counter top, and offer additional stabilization to rack 10.

Figure 2A:
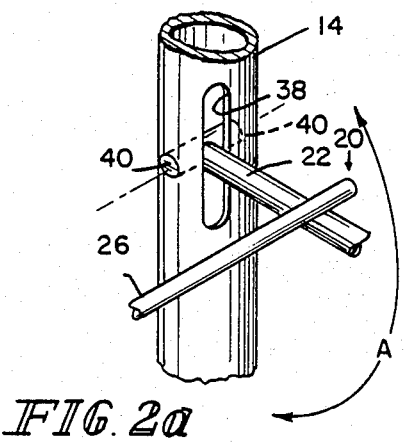
FIGS. 2a, 2b and 2c show details of the connection between the shelving elements and the first end frame of the cooling/baking rack of FIG. 1.
Figure 2B:
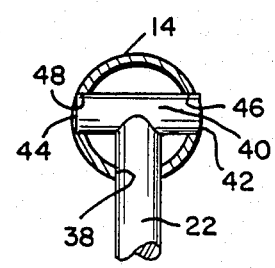

FIGS. 2a and 2b show the preferred manner of connecting shelving elements 20 to posts 14. This preferred manner involves formation of a plurality of T-shaped joints which allow shelving elements 20 to pivot in the direction illustrated by arrow A relative to posts 14. As illustrated in FIG. 2a, longitudinal beam 22 (24) extends beyond the end of shelving element 20 and into slot 38 formed in the wall of posts 14. Slot 38 is oriented longitudinally along posts 14 so as to allow shelving elements 20 freedom to rotate in the manner illustrated by arrow A. A transversely oriented element 40 is attached to the end of longitudinal beam 22 (24) to form the T-shaped member which is best illustrated in FIG. 2b. The extreme ends 42 and 44 of element 40 extend into circular openings 46 and 48 formed in the side wall of posts 14. As noted above, this arrangement allows shelving elements 20 to rotate in the manner illustrated by arrow A relative to lateral posts 14.

Figure 2C:
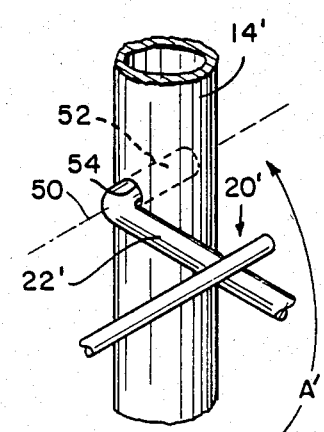

An alternative manner of connecting shelving elements 20' to posts 14' is illustrated in FIG. 2c. In this embodiment, longitudinal beam 22' (24') extends beyond the end of shelving element 20' and is bent outwardly along an axis 50 which is preferably generally transverse to the longitudinal axis of longitudinal beam 22' (24'). As illustrated in FIG. 2c, this arrangement forms an L-shaped connection in which the portion 52 of the "L" extends into an opening 54 in posts 14, through the center of the post and preferably into an opposing opening in the back side of post 14 (not shown). This arrangement provides the required vertical support for shelving elements 20, while allowing for pivotal movement along arrow A' relative to posts 14'. This arrangement has the advantage of not requiring provision of a slot (comparable to slot 38 of FIGS. 2a and 2b) in the side wall of posts 14'.

Figure 3A:
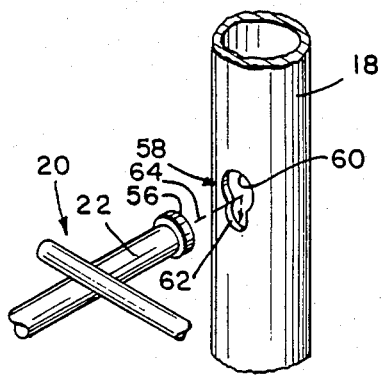
FIGS. 3a, 3b and 3c show details of the connection between the shelving elements and the second end frame of the cooling/baking rack of FIG. 1.
Figure 3B:
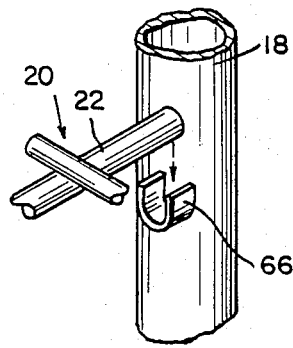
Figure 3C:
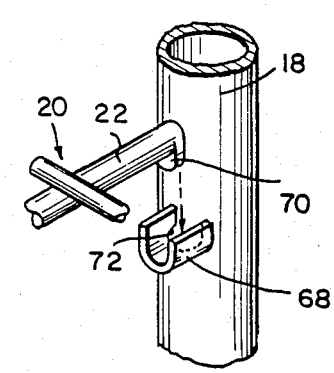

FIGS. 3a, 3b and 3c illustrate various alternatives for detachably connecting shelving elements 20 to second end frame 16. In the embodiment illustrated in FIG. 3a, longitudinal beam 22 (24) extends beyond the end of shelving element 20, and is provided on its end with an enlarged cap 56, which may, for example, be spot-welded, soldered or braised in place. An opening 58 is provided in the immediately adjacent portion of post 18. Opening 58 is provided with a relatively large diameter portion 60 which is disposed above a relatively small diameter portion 62, as illustrated in FIG. 3a. The large diameter portion 60 is sufficient to accommodate the enlarged cap 56, while the small diameter portion 62 is sized so as to accommodate the end of longitudinal beam 22 (24). Longitudinal beam 22 is inserted into opening 58 and then pressed downwardly in the manner illustrated by arrow 64, causing shelving element 20 to be "locked" into position. If desired, portions of post 18 and/or shelving element 20 may be coated with vinyl or other material having some resilience, such that the end of longitudinal beam 22 (24) must be pressed into the smaller portion 62 of opening 58 with some force, pressing the vinyl or other material to establish a tight, vibration-free fit.

FIG. 3b shows an alternative embodiment of the detachable connection between shelving units 20 and posts 18. In the embodiment of FIG. 3b, a plurality of U-shaped brackets 66 are provided along post 18. U-shaped brackets 66 receive the ends of longitudinal beam 22 (24) to provide the required vertical support to shelving units 20. FIG. 3c shows yet another embodiment which also uses a U-shaped bracket 68. In this embodiment, the end of longitudinal beam 22 (24) is provided with a downwardly extending projection 70 which fits into an aperture 72 provided in the interior portion of bracket 68. In addition to vertical support, this arrangement provides lateral support to shelving elements 20 and prevents shelving elements 20 from being pulled horizontally out of engagement with brackets 68.

FIG. 4a shows rack 10 immediately after removal of end frame 16 (i.e., posts 18), and prior to any substantial pivotal movement of shelving elements 20. Although end frame 16 is shown in this embodiment as comprising two separate posts 18, alternative arrangements may be constructed. For example, posts 18 may be connected by one or more cross braces extending between the posts so as to form a unitary end frame unit.

FIG. 4b shows the rack of FIG. 4a after downward pivotal movement of shelving elements 20 (relative to end frame 12) has begun. As discussed in connection with FIG. 2a above, provision of slot 38 in posts 14 allows for the downward movement of shelving elements 20, as illustrated in FIG. 4b. Assuming that slot 38 extends upwardly from the point of connection of shelving elements 20 to posts 14, upward pivotal movement, relative to end frame 12, is also possible.

FIG. 4c shows the rack of FIG. 4a as it nears the fully folded or collapsed position. If desired, a strap, or like device, 74 may be provided to secure the folded rack in position. End frame 16 (i.e., posts 18 of the illustrated embodiment) may also be secured in position by strap 74. This arrangement provides for a substantially flat assembly which may be stored in a closet, beside a cabinet, or in a similar area in which a relatively slim profile in at least one dimension is required.

The particular combination of design and material features described offers numerous advantages relating to durability, ease of use and marketability. It is to be clearly understood that the description given is intended by way of example only and not by way of limitation. Numerous design changes (including modification of dimensions or materials used) can be made while still remaining within the spirit and scope of the present. Accordingly, the invention is to be limited only by the terms of the following claims.

What is claimed is:

1. A foldable cooling/baking rack, comprising:
   a first end frame and a second end frame, each end frame including a pair of laterally spaced posts;
   a plurality of generally rectangular shelving elements, disposed horizontally and connected to said end frames;
   wherein said shelving elements are relatively fixedly and pivotably connected to said first end frame and detachably and non-pivotably connected to said second end frame to allow said elements to be detached from said second end frame and pivoted relative to said first end frame;
   wherein said shelving elements and said end frames are movable between an upright, operable position and a folded, inoperable position; and
   wherein said shelving elements are disposed generally perpendicularly to said end frames when the rack is in the upright, operable position, and are disposed generally non-perpendicularly to said end frames when the rack is in the folded, inoperable position.

2. A foldable cooling/baking rack according to claim 1, wherein a portion of the shelving elements fit into orifices in the laterally spaced posts of the second end frame.

3. A foldable cooling/baking rack according to claim 2, wherein said portion of the shelving elements and said orifices in the laterally spaced posts comprise means for locking the rack in the upright, operable position.

4. A foldable cooling/baking rack according to claim 1, wherein said shelving elements are pivotably attached to the first end frame by means of extensions of said elements which fit into an opening in the laterally spaced posts of the first end frame.

5. A foldable cooling/baking rack according to claim 4, wherein said extensions are T-shaped.

6. A foldable cooling/baking rack according to claim 1, further comprising means for locking the rack in the upright, operable position.

7. A foldable cooling/baking rack according to claim 1, wherein said generally rectangular shelving elements further comprise first and second oppositely disposed longitudinal beams, and first and second oppositely disposed transverse beams.

8. A foldable cooling/baking rack according to claim 7, wherein said shelving elements further comprise a plurality of members extending between said first longitudinal beam and said second longitudinal beam.

9. A foldable cooling/baking rack according to claim 7, wherein said shelving elements further comprise a backstop beam disposed directly above and extending parallel to said second longitudinal beam.

10. A foldable cooling/baking rack according to claim 1, wherein said rack further comprises a means for securing said end frames and shelving elements when in the folded, inoperable position.

11. A foldable cooling/baking rack according to claim 1, wherein said rack further comprises rubber stoppers, which attach to the bottom ends of the laterally spaced posts.

* * * * *